United States Patent Office 3,552,208
Patented Jan. 5, 1971

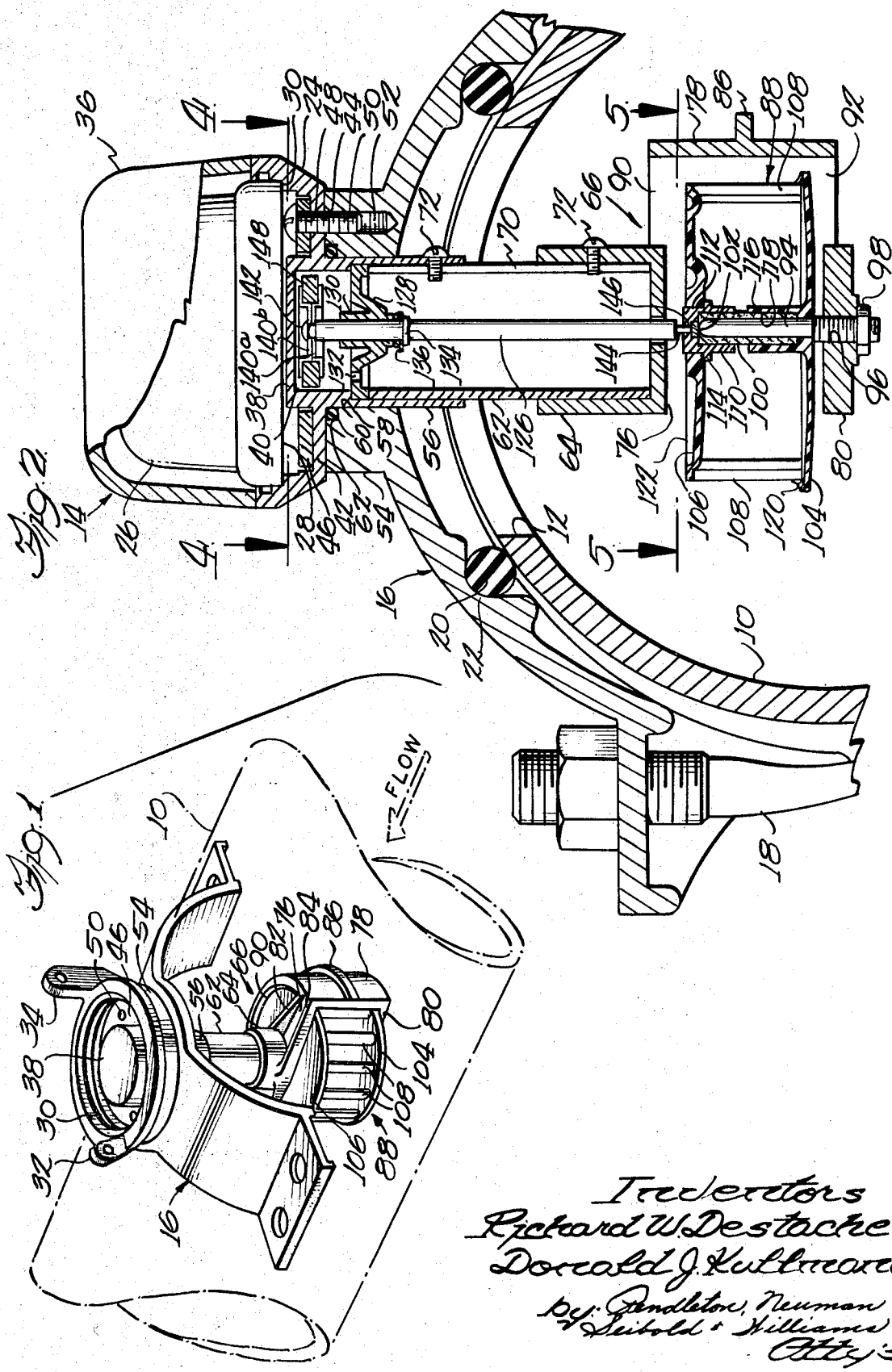

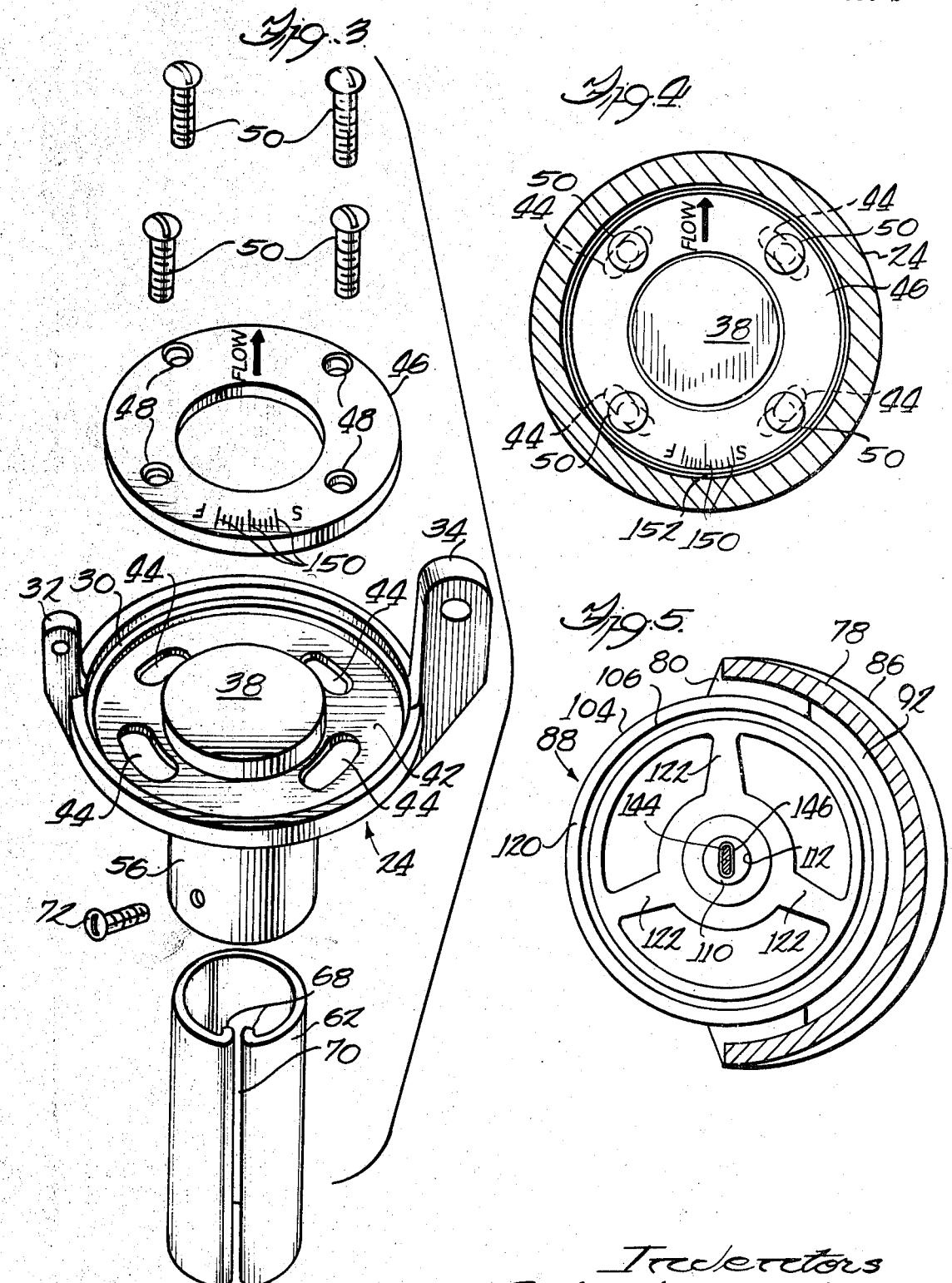

3,552,208
IMPELLER-TYPE FLOWMETER
Richard W. Destache, Milwaukee, and Donald J. Kullmann, Fox Point, Wis., assignors to Badger Meter Manufacturing Company, Milwaukee, Wis., a corporation of Wisconsin
Filed May 31, 1968, Ser. No. 733,393
Int. Cl. G01f 1/08
U.S. Cl. 73—230     3 Claims

ABSTRACT OF THE DISCLOSURE

A flowmeter having a partially shielded impeller and a support housing which is mounted on a saddle adapted to be clamped to a conventional conduit over an opening in the conduit wall through which the impeller is inserted to be submerged in the flow stream, with the support housing secured to the saddle by a slot and screw arrangement accessible externally of the assembly for providing angular adjustment of the housing and shield about the axis of the impeller to effect calibration of the meter. The support housing includes a multi-part telescopically joined vertical support assembly for ready adaptation to various installations.

CROSS REFERENCE TO RELATED APPLICATION

This application pertains to improvements in metering apparatus of the type disclosed in the copending application of Donald J. Kullmann and Bernard M. Silverberg, Ser. No. 653,215, filed July 13, 1967.

BACKGROUND OF THE INVENTION

Field of the invention

This invention pertains to flowmeters and more particularly to improvements in simple inexpensive impeller type flowmeters adapted to be easily mounted on conventional conduits, as in field installations for measuring water flow in irrigation systems.

DESCRIPTION OF THE PRIOR ART

The prior art includes a wide variety of meters for measuring fluid flow in conduits; however, such meters have exhibited various difficulties or disadvantages. Many require special housings or particular installation arrangements which preclude convenient field installations and calibration of the meters. Others are complex, expensive to manufacture and/or require change-gears or adjusting devices in the register for calibration. Such prior devices often require that the impeller dimensions and positions be closely matched to the inside configuration of of the conduit.

The aforementioned application of Kullmann and Silverberg notes many of the difficulties encountered with prior meters and discloses metering apparatus for overcoming these difficulties. In outline, that application discloses a flowmeter having an impeller which is partially shielded, a drive shaft and a parallel support extending axially of the impeller to a register drive and support adapter to be mounted on a conventional conduit over an opening in the conduit wall through which the impeller is inserted for submergence in the flowstream, with the shield being adjustable for adjusting the coverage or shielding of the impeller for calibration purposes.

SUMMARY OF THE INVENTION

It is an object of this invention to provide further improvements in metering apparatus of the type described in said Kullmann and Silverberg application. It is a further object of this invention to provide for calibration adjustment of the impeller shield externally of the flowmeter assembly. It is a further object of this invention to provide an improved impeller support arrangement which is conveniently adaptable to compensate for variations in the diameter of the conduit on which such metering apparatus is installed.

In general, the foregoing objects are achieved in one illustrative embodiment of the invention by providing an impeller shield having mounting means accessible externally of the metering assembly and adjustable for selectively varying the angular position of the shield about the axis of the rotor. Further, the impeller support structure includes an adapter for mounting on a meter support assembly, an impeller housing and shield unit and an independent support element affixed to the adapter and to the impeller housing unit.

For a more complete understanding of the invention, reference should now be had to the drawings wherein an embodiment is illustrated, as described below, by way of example of the invention.

BRIEF DESCRIPTION OF THE DRAWINGS

FIG. 1 is a perspective view of meter apparatus employing teachings of this invention, with a conduit on which the apparatus may be mounted indicated in dashed lines;

FIG. 2 is an enlarged partial cross-sectional view of the meter apparatus of FIG. 1 as assembled on a conduit, and including a register and a cover therefor;

FIG. 3 is an enlarged exploded view of the mounting and support components of the apparatus of FIG. 1; and FIGS. 4 and 5 are cross-sectional views taken generally along this 4—4 and 5—5, respectively, of FIG. 2 and looking in the direction of the arrows.

DESCRIPTION

Referring first to FIGS. 1 and 2, a conduit 10 is provided with an opening 12 in its wall to receive therethrough the drive components of the metering apparatus indicated generally by the number 14. The metering apparatus 14 is supported in a saddle 16 which is secured to the conduit 10, over opening 12, by a pair of saddle straps 18 encompassing the conduit. An O-ring 20 engages a groove 22 in the saddle 16 and is drawn into sealing engagement with the conduit 10, around opening 12, by the saddle straps 18.

The metering apparatus 14 includes an adapter 24 mounted on saddle 16 in alignment with the opening 12 and adapted to receive a totalizing register 26. This register may be of a known type, preferably being of the sealed, tamper-proof type, having a rotatable magnet drive element (not shown) adjacent the center portion of its bottom wall 28.

The adapter 24 includes a counterbore and a shoulder 30 for receiving and positioning the register 26. Upwardly extending ears 32 and 34 (FIG. 1) are adapted for hinged connection and securement of a complementary, protective cover 36 over the register. A central upwardly extending boss 38 defines a recess 40 on the underside of the adapter 24 for receiving a drive magnet, as will be described further below. Referring also to FIGS. 3 and 4, the floor 42 of an annular recess around boss 36 is provided with a plurality of circumferentially elongated openings 44. A flat annular, washer-like adjustment plate 46 is received over floor 42 and is provided with a corresponding number of openings 48 for registry with openings 44. Screws 50 pass through aligned openings 44 and 46 and threadably engaged tapped openings 52 in the upwardly extending annular boss 54 of the saddle 16.

The adapter 24 also includes an annular neck portion 56, which extends through an opening 58 in the boss 54 of the saddle. An O-ring 60 seats in a counterbore 62 in boss 54 to form a seal between the adapter 24 and the boss 54, around opening 58, when the screws 50 are tightened.

A drop support tube 62 has its upper end telescopically engaged in neck portion 56 and its lower end telescopically engaged in an upwardly extending neck portion 64 of an impeller housing 66. As will be observed in FIG. 3, tube 62 is formed by bending a flat sheet, which may be brass, with the opposing edges 68 being turned inward and defining a slot 70 therebetween. Set screws 72 and 74 threadably engage appropriate openings in the respective neck portions 56 and 64, and extend into slot 70. The nominal outer diameter of tube 62 matches the inner diameter of the neck portions 56 and 64 when the tube is relaxed, as during assembly. However, the width of slot 70 is less than the diameter of screws 72 and 74 whereby forcible insertion of these screws into slot 70 forces the edges 68 apart, thereby expanding the tube 62 into secure engagement with neck portions 56 and 64.

The impeller housing 66 also includes an upper support plate section 76, an impeller shield section 78 and a lower support plate 80. Upper support plate 76 is in the nature of a bar, extending upstream and downstream from the neck portion 64. Reinforcing ribs 82 and 84 which are integral with the longitudinal edges of the plate 76 and with the neck portion 64 provide additional support and rigidity for the components suspended from this plate. The impeller shield 78 is provided with a reinforcing rib 86 and extends over an arc of about 180° to shield one side of the impeller 88 from the flowstream. Lower support plaate 80 is also in the nature of a bar, and extends parallel to plate 76. The opposite ends of shield 78 are joined to upper plate 76 and to the lower plate 80 whereby the shield and the lower plate, together with the elements supported thereon, are supported by neck portion 64 and thus by drop tube 62. Openings are provided through the upper and lower walls of housing 66, between the respective bar-plates 76 and 80 and the peripheral edges of shield 78, as at 90 and 92, to permit macerated aquatic vegetation, trash, grit and the like to pass without jamming the impeller or causing excessive abrasion. The component parts 64, 76, 78 and 80, together with reinforcing ribs 82, 84 and 86, may be formed as an integral element, as by being molded of a suitable plastic, such as molded styrene acrylonitrile.

An impeller support spindle 94 is threaded into an opening 96 in the bottom plate 80 and extends upward, in axial alignment with the support tube 62, into a bearing recess 86 along the axis of rotation of the squirrel-cage type impeller 88. A lock nut 98 secures the spindle 94 in position. A sleeve bushing 100, which may be formed of graphite, provides radial bearing engagement with the spindle 94. An end bearing insert 102, which may be a jewel bearing, provides thrust bearing engagement with the upper end of the spindle 94 for carrying the impeller.

The impeller 88 may be of various forms. As illustrated, it comprises three molded sections including a bottom plate 104, an upper plate 106 having a plurality of depending curved blades 108 disposed about its periphery and integral therewith, and a coupling element 110. Coupling element 110 is received in a center opening 112 in upper plate 106 and is provided with an annular shoulder 114 engaging the underside of this plate. Bearing insert 102 is pressed into a recess in element 110, and the upper end of the bushing 100 is mounted in this element, as illustrated. Bottom plate 104 includes a boss 116 having a counterbore 118 receiving the lower end of bushing 100. A securing ring 120, which may be molded integral with blades 108, is secured to the periphery of bottom plate 104, as by welding or an adhesive. Plate 104 is assembled with a slight camber, as seen in FIG. 2, to provide a compressive pre-stress load between the two plates 104 and 106, the bushing 100 and element 110 for avoiding vibration of the rotor components in operation. Reinforcing ribs 122 are provided in the upper plate 106.

A drive shaft 126 is journaled in a bearing element 128 supported in sleeve 56, above tube 62. The element 128 includes a central journal boss 130, and an opening 132 permits equalization of pressure across the element. A retainer ring 134 snaps into an annular recess (not shown) in shaft 126 and engages the underside of an annular thrust bearing element 136 which engages the underside of boss 130. A drive magnet support, comprising hubs 140a and 140b, is secured to the upper end of shaft 128, as by a riveted end 142 on the shaft. At its lower end, the drive shaft 128 is flattened, as at 144, and has a relatively loose fit in a rectangular socket 146 formed in the upper end of element 110, thereby providing a kinematic drive joint between these parts. This provides substantial tolerance in alignment between the impeller and the drive shaft. A spider-type journal for shaft 128 may be provided within the lower portion of tube 62, if desired.

An annular drive magnet 148 is mounted between the hubs 140a and 140b for effecting magnetic drive coupling engagement with a smaller drive magnet (not shown) within the register 26, for instance, as illustrated in Kullmann, U.S. Pat. No. 3,248,583. The drive magnet 148 is disposed within the recess 40, closely adjacent the lower surface of the boss 38 and, thus, also closely adjacent the superposed lower wall of register 26 to position the magnets in close proximity to one another for providing a strong magnetic drive coupling therebetween. Adapter 24, or at least the boss section 38 thereof, is formed of nonferromagnetic material to permit this magnetic drive-coupling.

The various described elements, of course, may be formed of appropriate materials. In one advantageous embodiment for metering irrigation water, tube 62 and element 110 are formed of brass, shaft 126 is stainless steel, and the support housing 66, the impeller components 104 and 106, and the bearing elements 128 and 136 are formed of suitable plastics which are compatible with water. For instance, the bearing elements may be polyethylene or acetal, the impeller may be acetal and the housing 66 may be styrene acrylonitrile. By making the spindle 94, drive shaft 126 and clip 134 of stainless steel and the magnet hubs 140 and screw 142 of nonferromagnetic stainless steel, all parts are water compatible, and the water will serve as a lubricant for the bearings.

The shield section 78 extends from the center line of the impeller 88 (i.e., a center line parallel to the longitudinal axis of the conduit and, thus, parallel to the direction of stream flow, hereinafter referred to as the longitudinal center line of the impeller), on the upstream side of the impeller to a point approximating the center line on the downstream side of the impeller. As noted in the aforementioned prior application, by providing adjustability of the shielding device to vary the coverage of the impeller at the upstream edge, the speed of rotation of the rotor relative to the stream flow velocity can be controlled through a considerable range, e.g., at least ±10% of the rotor velocity for which the register is calibrated, with little or no degradation of linearity, sensitivity and accuracy of the rotor response. Thus, a meter installation with a fixed ratio register may be readily calibrated to accommodate variations in conduit inside dimensions within a nominal pipe size designation, as is normally encountered in the varieties of conduit used in irrigation service, simply by adjusting the shield to provide accurate read-out in that particular installation.

In the illustrated embodiment, the coverage of the impeller by the shield 78 in the area adjacent the upstream center line may be conveniently adjusted by manipulation of components externally of the meter assembly. This feature is obtained by providing rotatable adjustment of the impeller support and shield structure through the mechanism of the elongated openings 44 cooperating with the securing screws 50. For instance, by providing each opening 44 of an arcuate extent 20° greater than the arc subtended by the diameter of a screw 50, the upstream edge of the shield may be adjusted through an arc of 20°, e.g., 10° either side of the upstream center line, simply by loosening the screws 50 and rotating the impeller support and shield structure by rotating the adapter 24. Calibrating indicia 150 may be provided on adjustment plate 46, for registry with a reference indicia 152 (FIG. 4) on adapter 24 for reference by the operator in making adjustments. In many installations, a lesser degree of adjustment than that aforenoted may be entirely adequate, as by way of providing an adjustment range of 14° with an adjustment of 7° either side of the center line position.

In the illustrated embodiment, the shield section 78 also serves as the supporting connection for the lower plate 80 and, thus, for the impeller 88. While a shield of about 180° is illustrated in this embodiment, the shielding function, per se, would be adequately performed by a shield of lesser angular extent, such as by a shield extending from approximately the upstream center line through an arc of about 90°, i.e., to cover approximately one upstream quadrant of the impeller. In such a construction, posts or struts may be added between the impeller housing plates to assist in supporting the lower plate. It will be appreciated that the shield element need not be a portion of the support structure. For instance, the lower plate may be supported entirely by posts with the shield element being a separable element suitably secured to the support structure for rotatable adjustment therewith.

As is noted in the aforementioned application, an impeller unit of a single size may be utilized in conduits of varying sizes. However, the most accurate meter response is normally obtained by placing the impeller in a position to be acted upon by the highest velocity portion of the flowstream, which is normally the center portion in a closed conduit. To take best advantage of this, the impeller 88 is preferably disposed with its axis of rotation normal to the direction of flow, as with such axis along a diameter of the conduit, and with the exposed portion of the impeller in the center portion of the conduit (as with the center plane of rotation of the impeller in or closely adjacent a diametral plane of the conduit). In the illustrated embodiment, such positioning of the impeller may be obtained within reasonable accuracy simply by selecting a shaft 126 and tube 62 of appropriate lengths. Thus, impeller and impeller housing components of one size, as well as the adapter, register, and drive mechanism may be used in conduits of widely varying sizes. Simply by choosing a shaft 126 of the appropriate length and by inserting an appropriate drop support tube 62, an assembly is obtained suitable to a pipe of a particular size. Similarly, by providing an appropriate length of overlap between the tube 62 and the neck portion 56 and/or neck portion 64, a single tube 62 may be used with pipes of various diameters by adjustment at the points of securement by screws 64 and 74.

It will be obvious that various modifications of the specific embodiments shown may be made without departing from the spirit and scope of the invention.

It will thus be seen that a meter structure has been provided which is extremely simple and inexpensive to manufacture, and which is simple and easy to install and calibrate and to maintain in calibration. In the initial installation, the installer may utilize standard components, and select a drive shaft and drop tube in accordance with the conduit in which the unit is to be installed. Thereupon, he notes the particular type of conduit and flow conditions and calibrates the apparatus by appropriate positioning of adapter 24 with respect to adjustment plate 46 and securing screws 50. Thereafter, in the event flow conditions change, as by accumulation of sediment or other impediment in the conduit, or if experience should indicate that the unit is erroneously calibrated for any other reason, the calibration may be appropriately adjusted without removal of the meter unit simply by loosening the screws 50 and rotating the adapter and the depending support and shield structure to the desired setting and retightening the screws 50. Thus, these added advantages of flexibility and calibration are obtained while maintaining the advantages of this type of metering apparatus which are outlined in the aforementioned earlier application of Kullmann and Silverberg.

While a particular embodiment of this invention has been shown, it will be understood, of course, that the invention is not limited thereto since modifications may be made by those skilled in the art, particularly in light of the foregoing teachings. Therefore, it is contemplated by the appended claims to cover any such modifications as incorporate those features which may be said to constitute the essential features of these improvements within the true spirit and scope of the invention.

We claim:

1. Flowmeter apparatus comprising a mounting member for securing on a conduit with its underside adjacent said conduit, said mounting member having an opening therethrough for communicating with an opening in such a conduit, an adapter extending through said opening in said mounting member and supported on the upper side of said mounting member circumjacent said opening therethrough, an impeller to be disposed within the flow passage of such a conduit, a shield extending over a substantial segment of the periphery of said impeller for protecting said impeller, within said segment, from impingement thereon of a stream of fluid flowing in such conduit, a support member supporting said impeller and said shield on said adapter, a plurality of arcuate slots in said adapter circumjacent said opening in said mounting member, an adjustment plate overlying said slots for calibrating the position of said support and said shield, and fasteners extending through said adjustment plate and said slots and engaging said mounting member for clamping said adjustment plate against said adapter for securing said adapter to said mounting member, whereby said support, said impeller and said shield are angularly adjustable relative to said adapter and said plate upon loosening of said fasteners for adjusting the coverage of said impeller by said shield.

2. Flowmeter apparatus comprising a saddle member for securing on a conduit over an opening therein, an adapter on said saddle member including a neck portion for extending toward such an opening, an elongated tubular support having one end telescopically engaging said neck portion, an impeller to be immersed in a flow stream within such a conduit, and a housing for said impeller including a shield extending over a substantial segment of the periphery of said impeller for protecting said impeller, within said segment, from impingement thereon of fluid flowing in such flow stream, said housing including a neck portion telescopically engaging the other end of said tubular support.

3. Flowmeter apparatus as in claim 2 wherein said tubular support is formed with a slot extending the length thereof, and means on each of said neck portions engaging said slot for securing said neck portions and the respective end portions of said tubular support together.

References Cited

UNITED STATES PATENTS

| | | | |
|---|---|---|---|
| 1,593,291 | 7/1926 | Critchlow | 73—229 |
| 2,127,847 | 8/1938 | Schulte | 73—229 |

FOREIGN PATENTS

| | | | |
|---|---|---|---|
| 671,950 | 12/1929 | France | 73—229 |

RICHARD C. QUEISSER, Primary Examiner

J. K. LUNSFORD, Assistant Examiner